(12) United States Patent
Zacher et al.

(10) Patent No.: US 8,072,116 B2
(45) Date of Patent: Dec. 6, 2011

(54) BRUSH HOLDER

(75) Inventors: Martin Zacher, Schwabmuenchen (DE); Armin Hoffmann, Landsberg (DE); Helmut Burger, Prittriching (DE); Markus Forstner, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 141 days.

(21) Appl. No.: 12/589,402

(22) Filed: Oct. 21, 2009

(65) Prior Publication Data

US 2010/0096956 A1 Apr. 22, 2010

(30) Foreign Application Priority Data

Oct. 22, 2008 (DE) .......................... 10 2008 043 033

(51) Int. Cl.
*H02K 13/00* (2006.01)
(52) U.S. Cl. ...................................... 310/239

(58) Field of Classification Search .................. 310/239, 310/240, 241
See application file for complete search history.

(56) References Cited

U.S. PATENT DOCUMENTS

| 5,194,769 | A | * | 3/1993 | Ade et al. | 310/51 |
| 5,528,093 | A | * | 6/1996 | Adam et al. | 310/89 |
| 6,927,522 | B2 | * | 8/2005 | Skofljanec | 310/239 |

* cited by examiner

*Primary Examiner* — Nguyen N Hanh
(74) *Attorney, Agent, or Firm* — Abelman, Frayne & Schwab

(57) ABSTRACT

A brush holder (10) for a motor and having a plate-shaped base body (11) having an opening (13) for passing the motor rotor (30) therethrough, at least one brush receptacle (14) in which a carbon brush (15) is displaceably received, and an electronics can (12) projecting from the plate-shaped base body (11), closed at its side (21) adjacent to an axis (A) defined by the base body opening (13), and having an inner chamber (22) in which at least a portion of components of control electronics is received.

8 Claims, 2 Drawing Sheets

BRUSH HOLDER

BACKGROUND OF THE INVENTION

1. Field of the Invention

The present invention relates to a brush holder for a motor and including a plate-shaped base body having an opening for passing the motor rotor therethrough, at least one brush receptacle in which a carbon brush is displaceably received, and supporting electronic components of an electronics.

2. Description of the Prior Art

Brush holders of the type described above are used, e.g., in universal motors and have at least one carbon brush receptacle formed as a carbon brush container that forms a guide for the carbon brush and is arranged sidewise of a brush holder opening. The rotor of the universal or electric motor can extend through the opening and carries a commutator that is contacted by the carbon brush located in the brush receptacle.

In most universal motors, the brush holder and appropriate control electronics are separated from each other. However, in contemporary universal motors, it is desirable, e.g., to monitor the rotational speed of the rotor with a rotational speed sensor.

British Patent Publication GB 2,356,979 A discloses a brush holder that has not only a carbon brush receptacle for the carbon brushes but also serves as a board for different electrical motor-controlling components such as, e.g., an electric switch and resistances. The electrical control components contact electrically strip conducting lines provided on the brush holder. On the brush holder, there is further provided a heat sink for the motor control components.

The drawback of the brush holder disclosed in GB 2,356,979 consists in that the electrical control components are not protected from penetration of dust and particles which are produced, e.g., as a result of wear of the carbon brushes.

Accordingly, an object of the present invention is to provide a brush holder in which the drawbacks of the known brush holder are eliminated.

SUMMARY OF THE INVENTION

This and other objects of the present invention, which will become apparent hereinafter, are achieved according to the present invention by providing a brush holder that includes an electronics can projecting from the plate-shaped base body. The electronics can is closed at its side adjacent to the axis of the opening through which the rotor extends, and has an inner chamber in which at least a portion of the electronic components is received. The electronics can lies directly at the base body opening and extends in a direction the axis of the base body opening extends. With the arrangement according to the invention, at least a portion of components of the control electronics (preferably, dust or particle-sensitive components) are located in an electronics can, and the electronic components are effectively shielded from the opening and, in mounted condition of an electric motor, from the rotor, and are protected from penetration of dust or particles. Further, with the inventive arrangement of the electronic components, the motor cooling flow is used for cooling of the electronics component.

Advantageously, the electronics can is formed with the plate-shaped base body as one-piece part. Thereby, the brush holder can be produced, without large costs, e.g., as a plastic cast part.

It is further advantageous when the electronics can extends parallel to the opening axis, which permits to save space on the motor circumference.

For simplicity of assembly, it is advantageous when the electronics can has, on its side remote from the opening axis, a receiving opening through which the electronic components of the control electronics can be placed in the inner chamber of the electronics can.

Advantageously, the electronics can has a first sub-chamber located adjacent to the opening axis and a second sub-chamber remote from the opening axis. In the first sub-chamber, a rotational speed sensor is located. The arrangement of the rotational speed sensor in the first, adjacent to the opening and, thereby, to the rotor, sub-chamber, enables an optimal detection of the rotational speed with the rotational speed sensor.

It is also advantageous, when the electronics can has a plate extending parallel to the opening axis and separating the first sub-chamber from the second sub-chamber. With this plate, the rotational speed sensor can be simply secured in the first sub-chamber.

Advantageously, in the region of the receiving opening, a cooling element for cooling the components of the electronics is located. With the cooling element, the cooling of the components of electronics in the electronics can with the motor cooling flow can be noticeably improved.

Advantageously, the electronics components including a rotary speed sensor are cast in the electronics can together with a sealing compound. Thereby, penetration of the dust and particles in the inner chamber is completely prevented. Additionally, protection of the electronics components against impacts is insured.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENT

Figure 1:
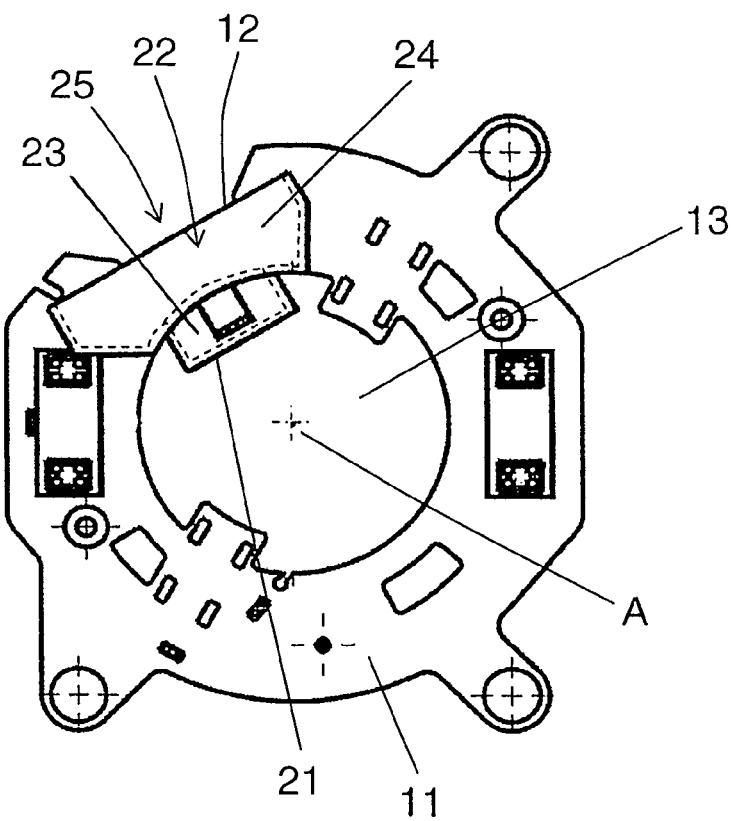
FIG. 1 a plan view of a brush holder according to the present invention without electronic components provided thereon.

A brush holder 10 according to the present invention for a universal motor of a hand-held power tool, which is shown in FIGS. 1 through 4, supports two brush receptacles 14 formed as brush containers. The brush receptacles 14 serve for guiding each a carbon brush 15 along the longitudinal axis of a respective brush receptacle 14. The carbon brushes 15 contact a commutator 31 of a rotor 30 of a universal motor (see, in particular, FIG. 3).

Figure 2:
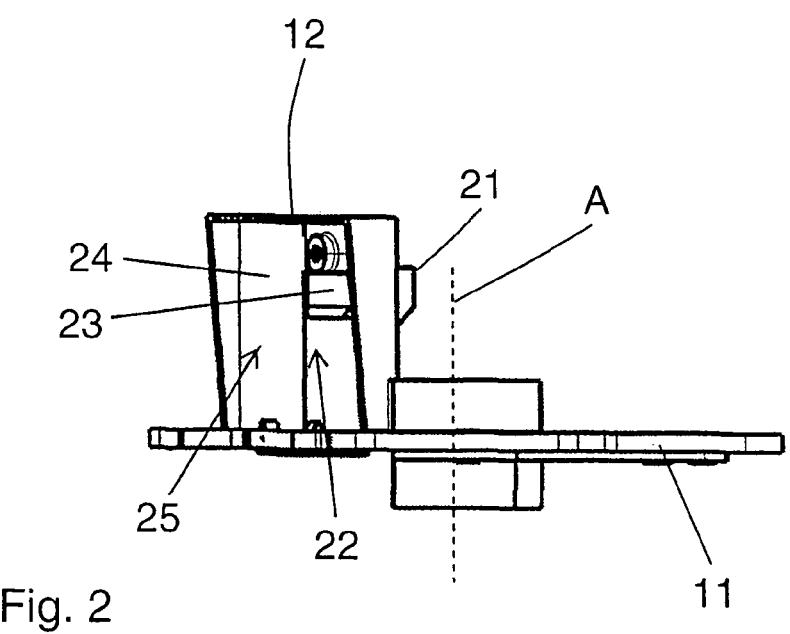
FIG. 2 a side view of the brush holder shown in FIG. 1 likewise without electronic components.
Figure 3:
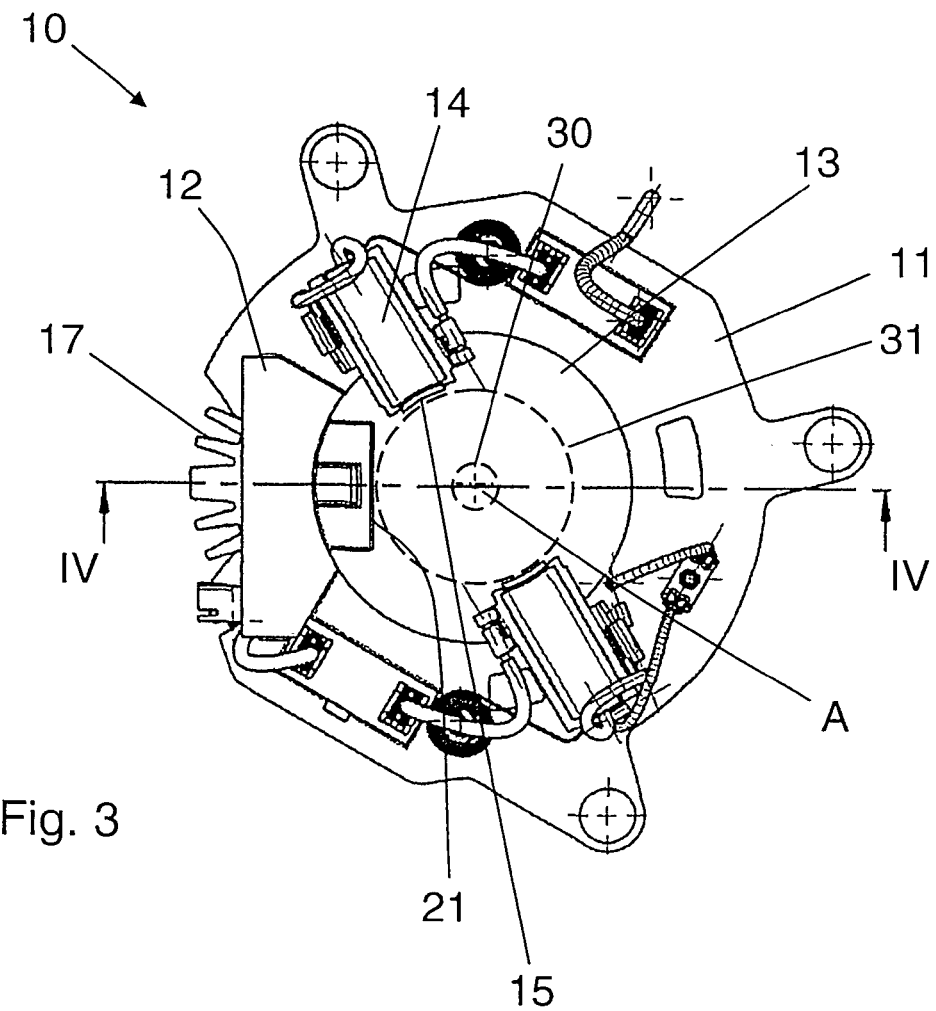
FIG. 3 a plan view of the brush holder shown in FIG. 1 and outfitted with the electronic components.
Figure 4:
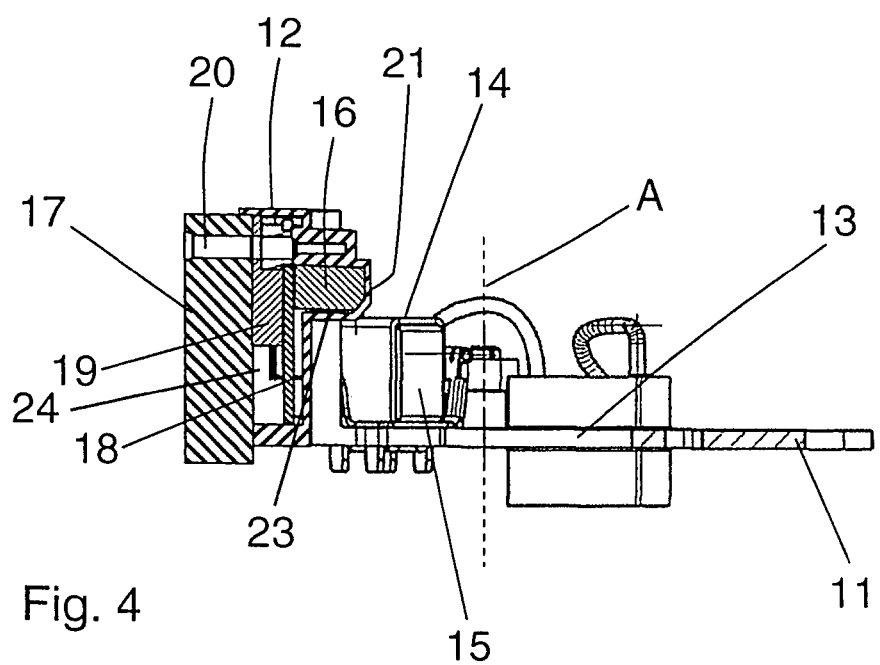
FIG. 4 a cross-sectional view of the brush holder shown in FIG. 3 along line IV-IV in FIG. 3.

FIGS. 1-2 show a non-outfitted brush holder 10 having a plate-shaped base body 11 formed as a base plate with a central opening 13, and an electronics can 12 that projects from the plate-shaped base body 11. One side 21 of the electronics can 15 overlie the opening 13 or partially projects in the horizontal projection of the opening 13, as shown in FIGS. 1-2. The opening 13 defines an axis A of the opening extending transverse to the plane of the plate-shaped base body 11. The electronics can 12 extends longitudinally parallel to the axis A of the opening and is closed at its side 21 adjacent to the axis A. The electronics can 12 has an inner chamber 22 that is accessible, in a non-outfitted condition of the brush holder 11 (FIGS. 1-2) through a receiving opening 25. The receiving opening 25 is provided on a side of the electronics can 12 opposite the side 21. The inner chamber 22 is divided in a first sub-chamber 23 formed as a sensor pocket, and a second sub-chamber 24. A speed sensor 16 of the electronics is located in the first sub-chamber 23 that is closer to the axis A of the opening 13, as can be seen in FIG. 4. The first sub-chamber 23 is limited by a plate 18 inserted in the second inner sub-chamber 24. The plate 18, which carries electronic components 19 (as components of the electronics) separates the first sub-chamber 23 from the second sub-chamber 24. The electronic components 19 and the speed sensor 16 are cast in the electronics can 12 with a sealing compound that protects them from dust, other particles and from mechanical impacts. In the region of the receiving opening 25, there is provided a cooling element 17 for cooling the electronic components 19 and the speed sensor 16. The cooling element 17, the electronic components 19, together with the plate 18 and the sealing compound, are secured in/on the electronics can 12 with a screw 20.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A brush holder (10) for a motor having a rotor (30), comprising a plate-shaped base body (11) having an opening (13) for passing the rotor (30) therethrough and defining an opening axis (A); at least one brush receptacle (14) in which a carbon brush (15) is displaceably received, and supporting components of an electronics; and an electronics can (12) projecting from the plate-shaped base body (11), closed at a side (21) thereof adjacent to the opening axis (A), and having an inner chamber (22) in which at least a portion of the electronics components is received, wherein the electronics can extends parallel to the axis (A) defined by the base opening (13), and wherein the electronics can (12) has, on a side thereof remote from the axis (A), a receiving opening (25).

2. A brush holder according to claim 1, wherein the base body (11) and the electronics can (12) are formed as one-piece part.

3. A brush holder according to claim 1, comprising an element (17) for cooling components of the electronics and located in a region of the receiving opening.

4. A brush holder according to claim 1 wherein components of the electronics including a rotary speed sensor (16) are cast in the electronics can (12) together with a sealing compound.

5. A brush holder (10) for a motor having a rotor (30), comprising a plate-shaped base body (11) having an opening (13) for passing the rotor (30) therethrough and defining an opening axis (A); at least one brush receptacle (14) in which a carbon brush (15) is displaceably received, and supporting components of an electronics; and an electronics can (12) projecting from the plate-shaped base body (11), closed at a side (21) thereof adjacent to the opening axis (A), and having an inner chamber (22) in which at least a portion of the electronics components is received, wherein the inner chamber (22) is divided in a first sub-chamber (23) located adjacent to the opening axis (A) and in which a rotational speed sensor (16) of the electronics is located, and a second sub-chamber (24) remote from the opening axis (A).

6. A brush holder according to claim 5, wherein the electronics can (12) has a plate (18) extending parallel to the opening axis (A) and separating the first sub-chamber (23) from the second sub-chamber (24).

7. A brush holder according to claim 5, wherein the base body (11) and the electronics can (12) are formed as one-piece part.

8. A brush holder according to claim 5, wherein components of the electronics including a rotary speed sensor (16) are cast in the electronics can (12) together with a sealing compound.

\* \* \* \* \*